July 13, 1965
E. R. McCLELLAND ET AL
3,194,290
APRICOT PITTER
Filed April 11, 1963
6 Sheets-Sheet 1
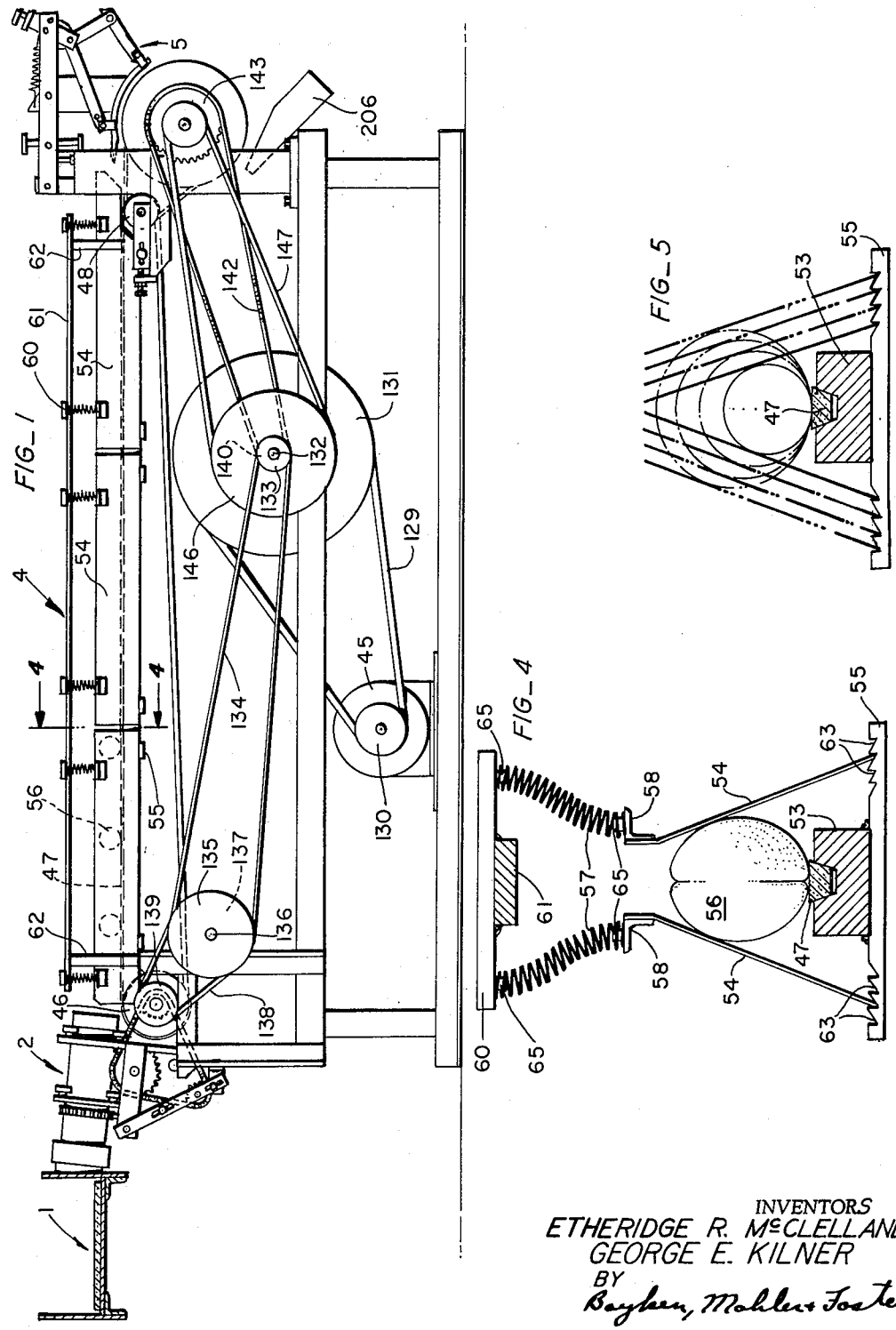
INVENTORS
ETHERIDGE R. McCLELLAND
GEORGE E. KILNER
BY
ATTORNEYS

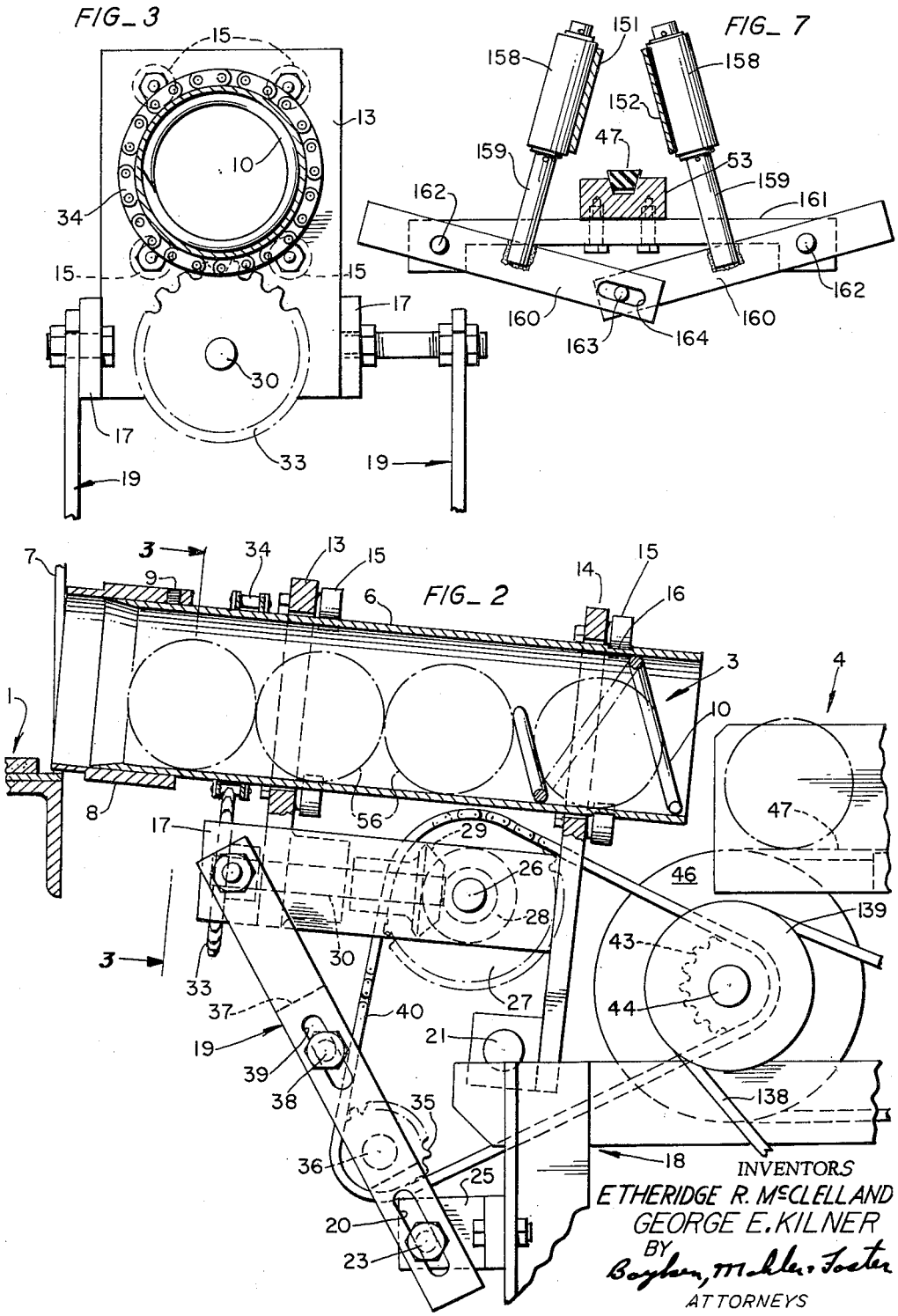

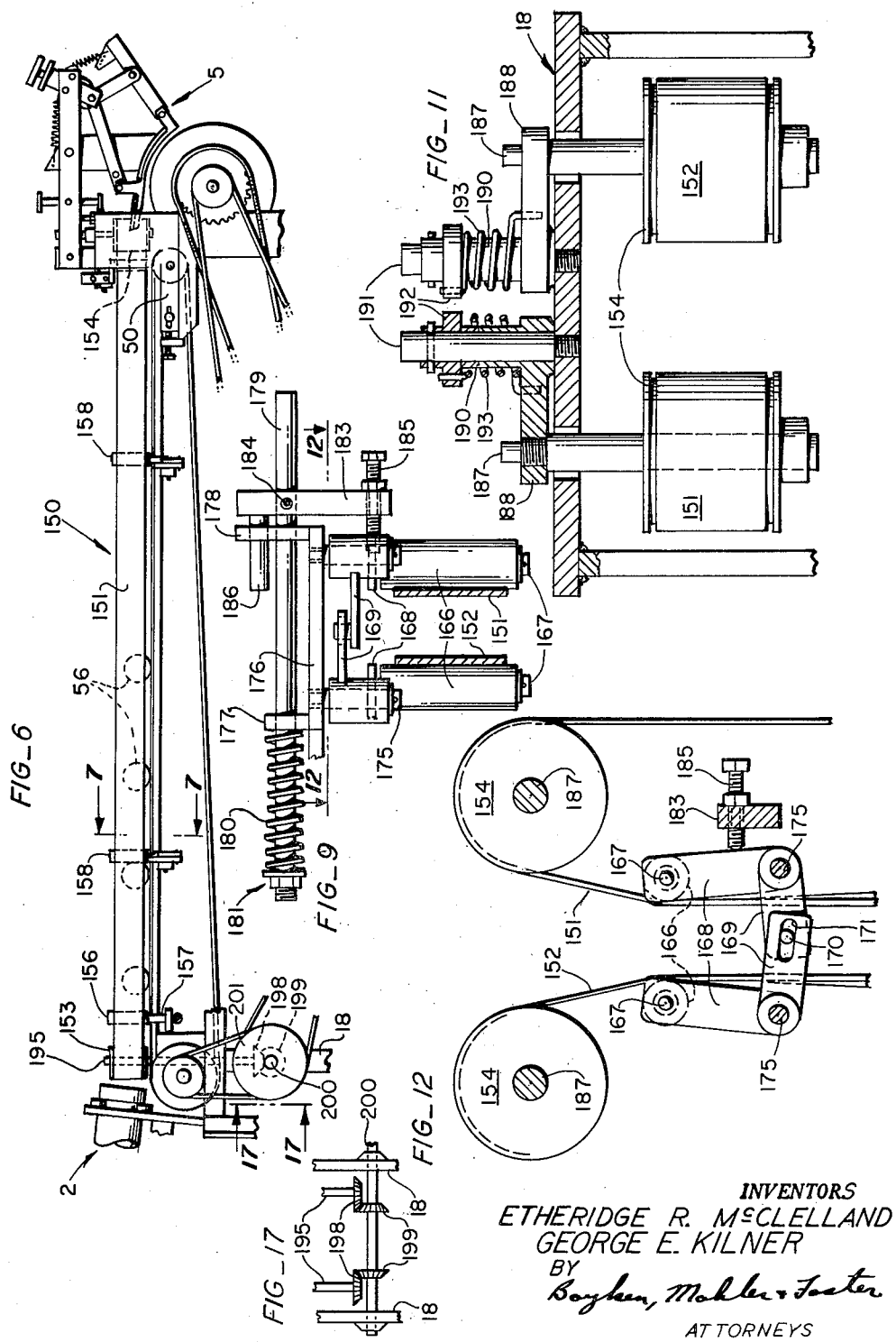

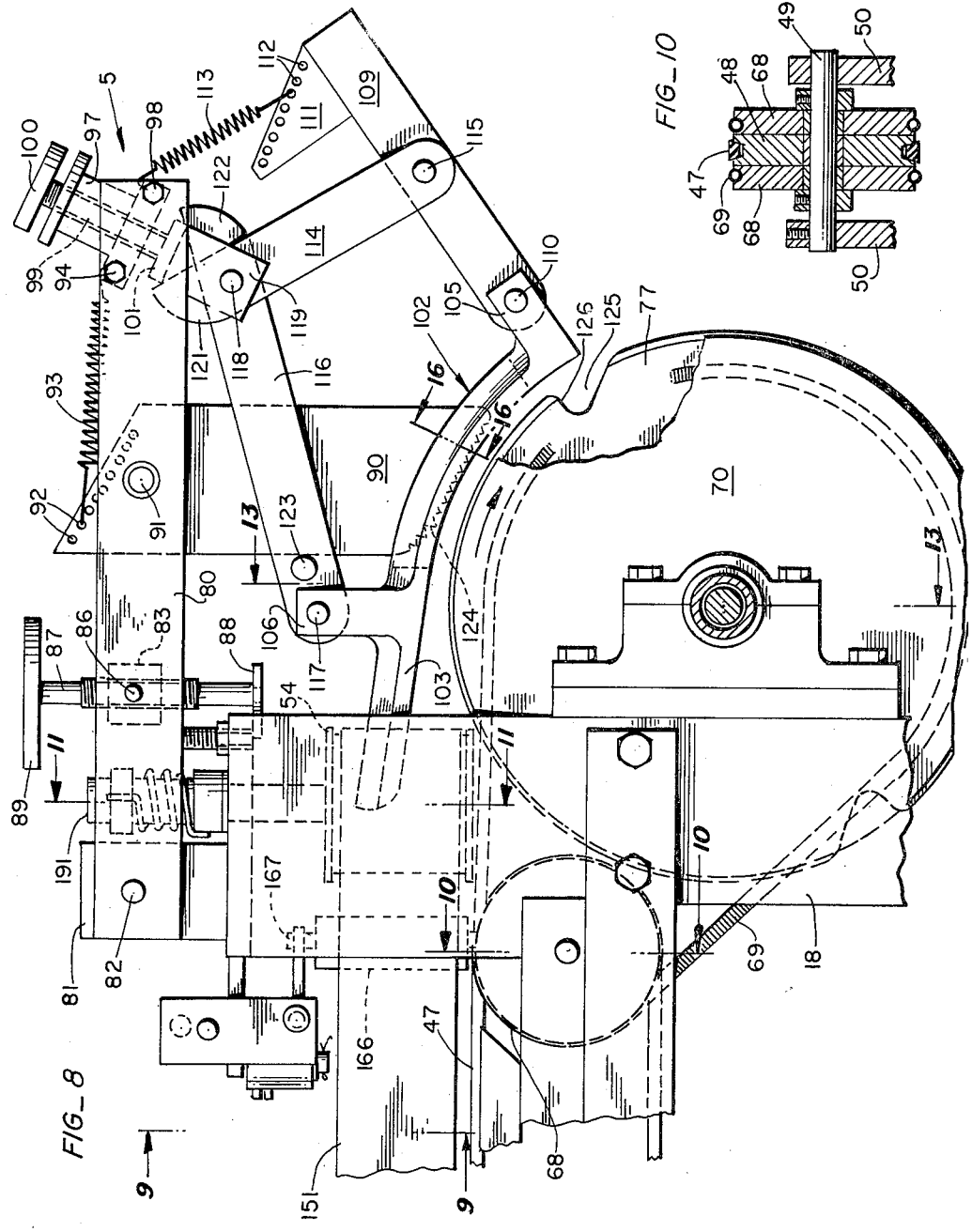

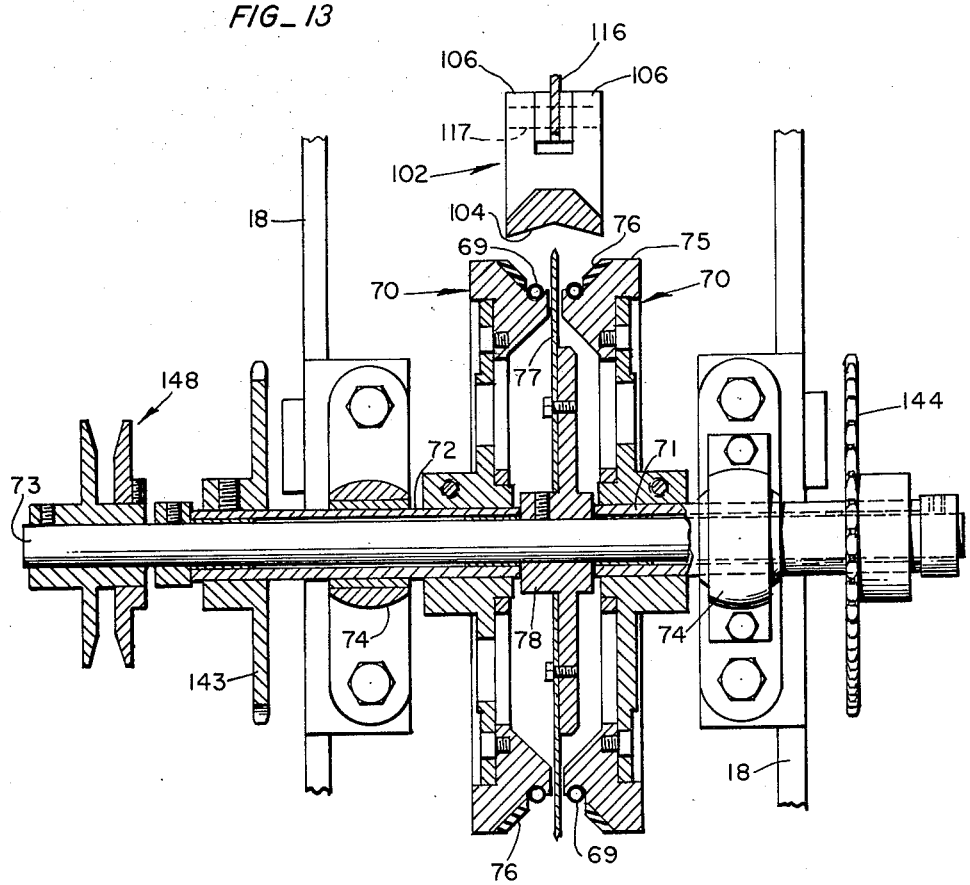
FIG_13
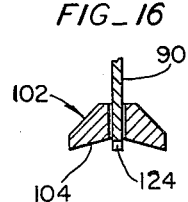
FIG_16

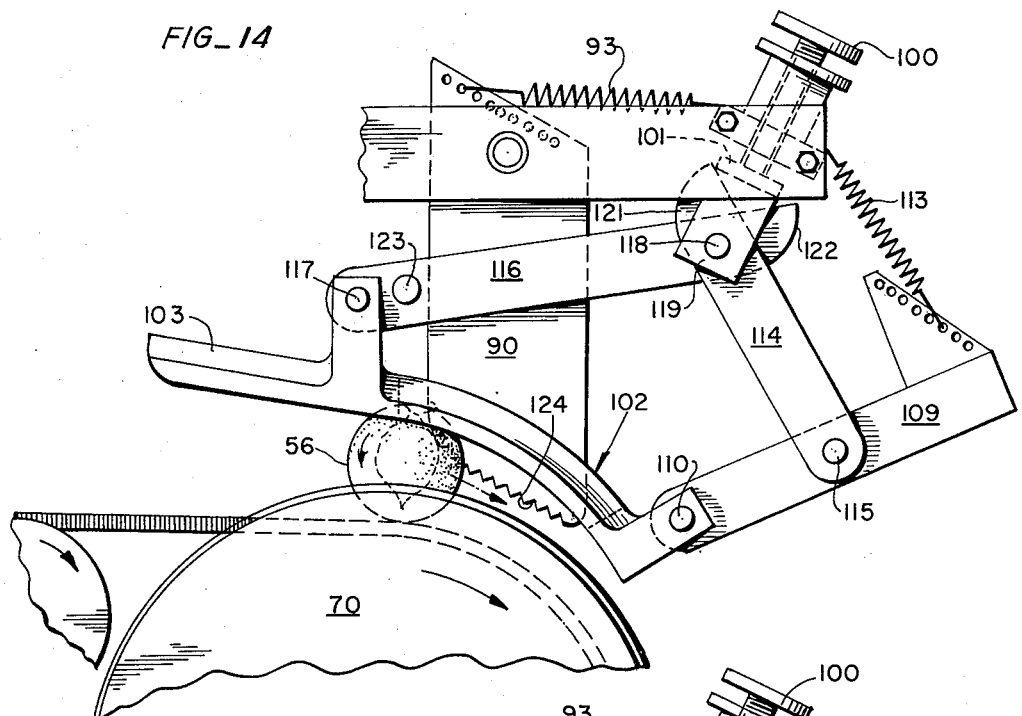
FIG_14
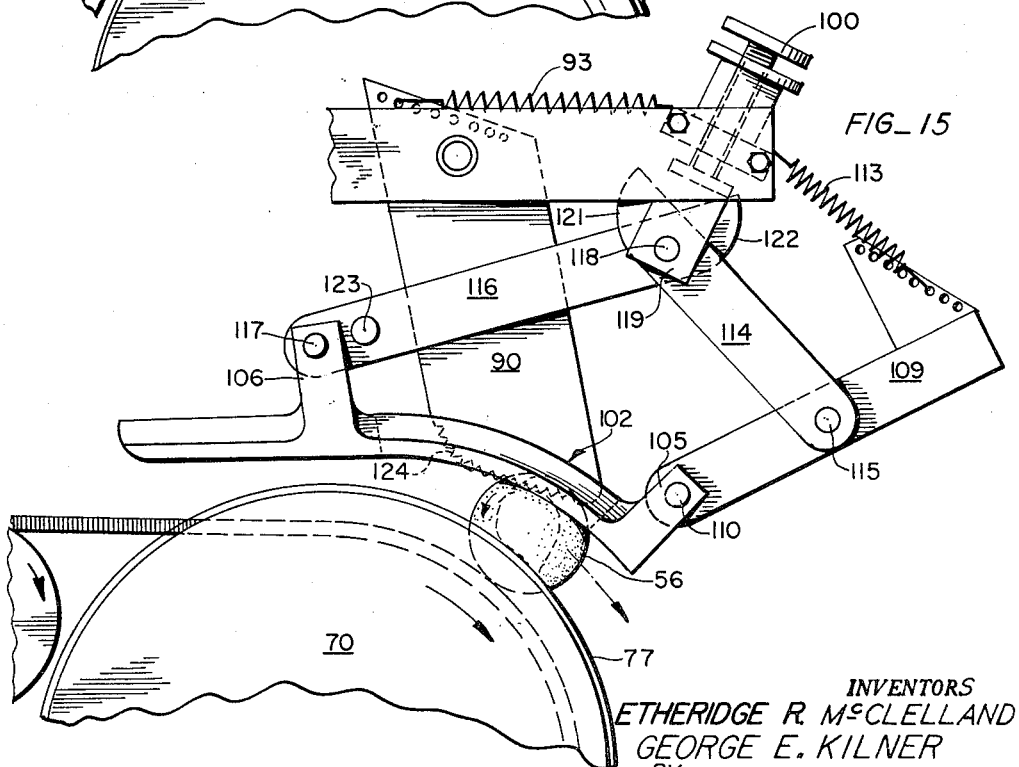
FIG_15
INVENTORS
ETHERIDGE R. McCLELLAND
GEORGE E. KILNER
BY
Boyken, Mohler + Foster
ATTORNEYS United States Patent Office 3,194,290
Patented July 13, 1965

3,194,290
APRICOT PITTER
Etheridge R. McClelland, Hayward, and George E. Kilner, Oakland, Calif., assignors to Filper Corporation, San Ramon, Calif., a corporation of California
Filed Apr. 11, 1963, Ser. No. 272,253
17 Claims. (Cl. 146—238)

This invention relates to a freestone drupe pitter and is of generally the type shown in U.S. Patent 2,745,453 issued to Joseph Perrelli et al., May 15, 1956, and also as generally shown in copending application Serial No. 154,989 filed November 27, 1961 by Carl T. Petersen.

Heretofore, as shown in said patent, it has been the practice to move whole drupes, such as apricots, between parallel, opposed, vertically disposed belts that extend horizontally to the upper portions of a pair of vertically disposed, opposed, slightly spaced annular rims. The outer peripheral surfaces of these rims are formed to cooperate for forming an outwardly opening generally V-shaped annular seat on which each apricot would be centered, and also the rotation of the rims would carry the apricots away from the belts. As the apricots were carried around the rims they would be moved past a bisecting knife that would bisect the body of the fruit to the pit so as to free the pit. Hold-down elements were provided to hold the apricots against the rims.

While the above arrangement would successfully pit and bisect the majority of the apricots, the variations in the latter as to size, shape and the tenacity with which the pits would cling to the fruit, resulted in some fruit being improperly pitted, or in the pits clinging to one or both of the halves. Also in some instances the apricots would not be properly oriented with respect to the position of their sutures, and at times thin slices would be taken off the halves, which represented waste.

One of the objects of the present invention is the provision of an apricot pitter that is more efficient than heretofore, and that may readily be adjusted to meet changing conditions.

Another object of the invention is the provision of improved means for releasing the pit after the apricot has been bisected.

An added object of the invention is the provision of improved means for more quickly and efficiently regulating the means for holding the apricot halves against the apricot rotating and moving means.

As has already been mentioned, in the pitting of apricots, it is important that the apricots be oriented so that they are bisected in the plane of the suture of the pit. Thus the orienting and pitting are successive cooperatively related steps for accomplishing the final end of a properly bisected, pitted apricot.

One of the objects of this invention is the provision of a combination of elements or mechanisms for moving the apricots in single file along a straight path extending longitudinally of the file and spacing, orienting and pitting said apricots without stopping their movement in one direction.

Other objects and advantages will appear in the description and in the drawings.

In the drawings:
FIG. 1 is a side elevational view of the combination of feeding, spacing, orienting and pitting mechanisms in a straight line extending from a bulk feed conveyor.

FIG. 2 is an enlarged part sectional and part elevational view of the invention at the feed end where the apricots are taken from the bulk feed belt.

FIG. 3 is a cross sectional view taken along line 3—3 of FIG. 2.

FIG. 4 is a cross sectional view taken along line 4—4 of FIG. 1.

FIG. 5 is a semidiagrammatic view similar to that of FIG. 4 showing several adjustments of the elements disclosed in FIG. 4.

FIG. 6 is a fragmentary side elevational view similar to that of FIG. 1, but showing a different form of the invention.

FIG. 7 is an enlarged cross sectional view taken along line 7—7 of FIG. 6.

FIG. 8 is an enlarged side elevational view of the pitting end of the apparatus of FIG. 6, partly broken away.

FIG. 9 is a cross sectional view taken along line 9—9 of FIG. 8.

FIG. 10 is a fragmentary cross sectional view taken along line 10—10 of FIG. 8.

FIG. 11 is an enlarged cross sectional view taken along line 11—11 of FIG. 8.

FIG. 12 is a fragmentary cross sectional view taken along line 12—12 of FIG. 9.

FIG. 13 is a cross sectional view taken along line 13—13 of FIG. 8.

FIG. 14 is a fragmentary elevational view showing one position of an apricot at the pitting station.

FIG. 15 is a fragmentary elevational view showing another position of the apricot at the pitting station.

FIG. 16 is a cross sectional view of the hold-down device as seen from line 16—16 of FIG. 8.

FIG. 17 is a cross sectional view taken along line 17—17 of FIG. 6.

Referring to FIG. 1, at the extreme left hand end of the view is a conventional conveyor belt 1 on which apricots in indiscriminate, bulk arrangement are carried. This is one belt of the common so-called "merry-go-round" such as is indicated in copending application Serial No. 56,467, filed September 16, 1960 by George E. Kilner et al.

Apricots on belt 1 are shunted into the feed device generally designated 2, down which they roll in single file to a spacing means 3 (FIG. 2) in the lower end of the feed device that functions to deliver the apricots, one at a time in spaced relation onto the receiving end of a combination transfer conveyor and orienter generally designated 4 (FIG. 1), where the apricots are carried in single file, spaced relation to the pitter 5.

One of the highly desirable features of this combination is the fact that from the moment the apricots leave the bulk feeding conveyor they move substantially continuously along a substantially straight line in a single file through all phases of the operation. Heretofore operators usually manually fed the apricots, one at a time to the pitter, whereas, in the present invention, the entire process is automatic once the apricots are on the bulk feed conveyor.

*Apricot feed*

Referring to FIG. 2, the feeder 2 comprises an open-ended cylinder 6, one open end of which is adjacent to one edge of the bulk feed conveyor belt 1 and said one open end is at an opening in the fence 7 along said one edge so that apricots carried on belt 1 may readily enter the open end of cylinder 6.

Adjustably secured on the upper end of the cylinder and coaxial with the latter is a cylindrical collar 8 that fits around the outside of the upper end portion of said cylinder. A set screw 9 adjustably secures said collar on said cylinder with a portion of said collar projecting outwardly of the upper end of the cylinder to a position extending over the support for belt 1 and adjacent to the edge of the latter. The projecting end of collar 8 may be externally reduced in thickness so that the inner surface of the collar that is adjacent to belt 1 is below the level of the upper surface of the belt. Thus the collar will present no obstacle to free rolling of apricots into the collar. The upper end of the cylinder that is within the collar is bevelled to permit the free rolling of apricots from the collar into the cylinder proper, although the collar 8 may be considered part of the cylinder.

This structure permits accurate adjustment of the feed device relative to the conveyor 1 without attempting to adjust the entire assembly. It is merely necessary to adjust collar 8 axially of the cylinder to exactly the proper position since it is movable relative to the cylinder.

Cylinder 6 is slightly inclined downwardly from conveyor 1, and it is of a diameter that is greater than the maximum diameter of the apricots that are to be pitted, and said diameter is substantially less than double the diameter of the minimum sized apricots, hence there can be no piling or jamming of the apricots within cylinder 6. They must roll in single file down the cylinder.

A relatively short section of a spirally formed rod 10 (FIG. 2) is secured against the inner surface of the cylinder at its lower end. This rod makes slightly more than one turn and the axial spacing of the rod in making this turn is such that a single apricot will enter the open upper end of the coil as the cylinder is rotated in a counterclockwise direction as seen in FIG. 3, and will be delivered out of the lower open end of the cylinder while the next apricot will be momentarily retarded until the open end of the coil makes one revolution so as to admit the next apricot. The free ends of the rod 10 are tapered off (FIG. 3) to the inner surface of the cylinder so the fruit will not be struck and injured by said ends.

Upper and lower frame members 13, 14 (FIG. 2) in the form of spaced opposed plates are formed with circular openings through which the upper and lower end portions of the cylinder rotatably extend and four equally spaced rollers 15 (FIG. 3) around each opening support the cylinder for rotation about its axis. The exterior of the cylinder 6 is preferably formed with an outwardly opening annular recess 16 in which the lower set of rollers 15 travel, and the recess also prevents axial movement of the cylinder as it rotates.

The frame members 13, 14 are connected by side frame members 17, and the lower frame members 14 extend downwardly to the adjacent end of the main frame 18 where it is swingably supported by pivots 21 for varying the tilt of the cylinder. Adjustable arms 19 extend from frame 18 upwardly and are pivotally connected at their upper ends with frame members 17 adjacent to the upper end portion of the cylinder 6 for supporting and holding the cylinder in its properly inclined position. Each arm 19 may be longitudinally slotted at 20 adjacent to its lower end for a bolt 23 that adjustably connects said lower end to a bracket 25 on main frame 18.

Side frame members 17 may be journalled to rotatably support a horizontal shaft 26 on which a sprocket wheel 27 is secured. A bevel gear 28 is also secured on shaft 26, the teeth of which are in mesh with the teeth on a bevel gear 29 that, in turn, is secured on a shaft 30, which shaft 30, in turn, is supported for rotation in a bearing carried by the lower end portion of the upper frame member 13. This shaft 30 is parallel with the cylinder 6, and has a sprocket wheel 33 secured on its upper end above the lower portion of frame member 13.

A sprocket chain 34 is secured around the cylinder 6, and the pins on the links of this chain are in mesh with the teeth of the sprocket wheel 33.

A chain take-up sprocket wheel 35 is secured on a shaft 36 that, in turn, may be journalled for rotation in bearings on plates 37, which plates are adjustably secured to each arm 19 by a bolt 38 extending through a slot 39 in each arm 19.

A sprocket chain 40 extends around a sprocket wheel 43 that is on a shaft 44. This shaft 44 is driven, through a series of conventional driving connections, by the main motor 45 (FIG. 1). It may be here noted that shaft 44 also carries a pulley 46 over which one end of a horizontally extending apricot supporting belt 47 extends; hence the cylinder 6 and belt 47 are connected for simultaneous operation.

*Apricot aligner and transfer conveyor*

In the form of aligner and transfer conveyor as illustrated in FIGS. 1–5 and in FIGS. 6–10, the belt 47 (FIG. 4) that extends over pulley 46 is an endless belt, the upper flight or run of which extends horizontally away from cylinder 6, and generally in longitudinal alignment with the latter to and over a pulley 48 (FIG. 10) that is rotatable on a shaft 49. Shaft 49 is secured to adjustable take-up plates 50 (FIGS. 6, 10) that are carried on the main frame 18 at the end thereof opposite to pulley 46, and a bushing on shaft 49 rotatably supports pulley 48 (FIG. 10).

Belt 47 is generally a V-belt and the tapered lower side of the upper run thereof is slidably held in an upwardly opening groove formed in the upper surface of a rigid support 53 that extends longitudinally of the belt (FIG. 4).

Pairs of horizontally spaced, horizontally elongated generally vertically disposed strips 54 are swingably supported on their lower edges on rigid supports 55 at opposite sides of the upper run of belt 47. The drawing shows a plurality of sets of said strips in longitudinal alignment extending from the pulley 46 to a point beyond the pulley 48 (FIG. 1).

Strips 54 are flat and extend slantingly upwardly in cross sectional contour to a point spaced above the largest of the fruit to be handled by the apparatus. In FIG. 4 an apricot 56 is indicated in a position between the opposed strips. The latter are yieldably held in positions inclined toward each other to a degree that they will yieldably engage the apricots 56 at points spaced above the level of the center of each of said apricots. Overhead helical springs 57 function to yieldably support the strips 54 in their inclined positions in which they will yieldably engage the fruit, as already mentioned. The lower ends of the springs are held on angle strips 58 that are secured to the strips 54 along their upper edges, while rigid cross pieces 60 secured on an overhead bar 61 that, in turn, extends longitudinally of the apparatus and bar 61 is supported on frame 18 by posts 62 (FIG. 1).

The lower edges of strips 54 are each swingably supported in one of a series of grooves 63 formed in cross pieces 56 that are rigid with the belt support 53.

FIG. 5 illustrates the different positions that the strips 54 may be held, which varies according to groove 63 in which they are positioned.

Projections 65 on angle strips 58 and on cross pieces 60 are adapted to removably hold the springs in position extending between strips 54 and the overhead cross pieces 60 so that the springs may be quickly replaced and the strips 54 quickly shifted to meet changes in the apricots that are being pitted. Normally the apricots are not promiscuously mixed as to size and variety, hence when strips 54 are adjusted for a particular variety the apricots will be reasonably uniform.

In the arrangement shown in FIG. 4 the apricots will be rapidly rotated as they are carried along belt 47 by movement of the latter, and the strips 54 will yieldably hold the apricots against the belt. Since the apricots are slightly flattened (FIG. 4) at opposite sides of the plane of the suture of each apricot, they will automatically position themselves with their sutures in a vertical plane. Because of the fact that the strips 54 are flat and the fact there is only point-to-point contact between them and each apricot, they rapidly rotate as they are moved.

Pitter

Upon the apricots reaching the pitter, or upon their reaching the end of belt 47 at pulley 48, they are immediately moved onto the pitter 5.

At opposite sides of pulley 48, and on the bushing supporting the pulley 48 for rotation thereon, is a pair of corresponding pulleys 68 (FIG. 10) each formed with an outwardly opening groove in its outer periphery to receive an endless coil spring belt 69. Thus a pair of said belts 69 is provided, and each of these belts extends around one of a pair of wheels 70, said belts being held in annular outwardly opening recesses formed in said wheels (FIG. 13).

The upper runs of the spring belts 69 extend substantially horizontally from the upper sides of pulleys 68 to the points where they extend over wheels 70 (FIG. 8), and said runs are spaced apart to support each apricot thereon and to carry it onto the wheels 70.

Wheels 70 are in spaced opposed relation and are centrally secured on the adjacent ends of a pair of hollow shafts 71, 72 (FIG. 13), which shafts, in turn are rotatable on a central shaft 73. Shafts 71, 72 are journalled for rotation in bearings 74 that are rigid on the main frame 18.

Each wheel includes an annular outer rim 75 and radially outer adjacent corners of the pair of rims 75 are bevelled to form, together, a generally V-shaped seat with a space between the convergent ends of the V. The beveled or slanted surfaces of the V-seat are each faced with a rubber strip 76 that may be transversely grooved on its outer surface to form an anti-friction surface. These strips may, of course, be of any suitable rubber-like plastic material that is resistant to deterioration under any of the normal operating conditions.

The grooves for the spring belts 69 are formed along the convergent ends of the V-surfaces formed by the outer peripheries of the rims 75, and the adjacent opposedly facing surfaces of the rims 75 along the adjacent sides of the pair of grooves for belts 69 and radially inwardly of the belts are flat and close to opposite sides of a central generally circular bisecting blade 77.

Blade 77 is centrally secured on a hub 78 that, in turn, is secured on shaft 73. The outer cutting edge of said blade 77 extends centrally into the V-seat through the apex thereof to a point substantially even with the radially outermost surfaces of the rims along the divergent edges of said V.

The proportions of the V-seat formed by the bevelled sides of the rims, or by the rubber-like facings 76, and the distance the bisecting blade 77 extends into said seat are such that an apricot delivered onto the V-seat by the spring belts 69, and rotated relative to the rims, will quickly be bisected to the pit.

Due to the spacing of the apricots at the feed device 2 by the spiral rod 10 in cylinder 6, the apricots will be delivered to the wheels 70 in spaced relation so there will be no interference of the apricots with each other in a bisecting and pitting operation.

FIG. 8 shows the apricot hold-down mechanism when it is inoperative, and FIGS. 14, 15 show the same mechanism at the beginning of the pitting operation and at the end thereof. It is important that this mechanism be quickly adjustable to meet changes in the fruit, and the present arrangement provides for such adjustment. Inasmuch as the hold-down portion is adapted to bodily rock in accordance with the outer contour of each apricot passing between it and the wheels 70, the adjustment must be such that the desirable operation of the hold-down in each of its actions is not sacrificed by providing a simple means for quickly making the adjustment.

Carried on a portion of the main frame 18 that is adjacent to the pitter 5, and in a position spaced above the wheels 70, are a pair of horizontally extending, parallel, horizontally spaced, opposed arms 80 (FIG. 8). One of the ends of arms 80 are pivotally connected to an upstanding projection 81 on frame 18 by a horizontal pivot 82. Arms 80 extend from projection 81 rearwardly over wheels 70, the pitter being at the rearward end of the apparatus, and the feeder 2 at the forward end. A vertically adjustable block 83 is disposed between arms 80 at a point intermediate opposite ends of said arms, but closer to the forward ends of said arms than to their rearward ends. Horizontal coaxial oppositely outward pivots 86 on said block pivotally connect with arms 80, and a vertically extending adjusting screw 87, rotatably supported at its lower end on a bracket member 88 on frame 18 threadedly extends through block 83. A hand wheel 89 on the upper end of said screw is accessible for rotating the screw to thereby cause the outer ends of arms 80 to be elevated or lowered about the axis of pivot 82.

A vertically disposed, vertically elongated, pit engaging blade 90 is positioned between arms 80 at a point rearwardly of the adjusting screw 87. This blade is coplanar with the bisecting blade 77 that, in turn, is positioned between wheels 70, and it is supported at its upper end on a horizontal pivot 91 extending between and carried by the arms 80. The upper edge of the blade 90 is formed with a row of spring engageable openings 92 extending slantingly downwardly in a rearward direction from the upper portion of said blade 90, which upper portion is above pivot 91. A helical spring 93 is engaged in one of said openings at one of the ends of said row, and the opposite end of said spring is connected with a bolt 94 that is secured to arms 80 at the rearward ends of the latter.

By the above means the lower end portion of blade 90 is yieldably urged to swing forwardly about the axis of pivot 91. The tension of spring 93 is varied as desired by connecting the forward end thereof in different holes 92.

Carried at the rearward ends of the arms 80 in a position between them is a block 97 that is rigidly secured to arms 80 by bolts 94, 98, and which bolts also secure the rearward ends of the arms 80 rigid relative to each other.

An adjusting screw 99 threadedly extends through said block, said screw being inclined forwardly in a downward direction relative to vertical, and having a hand wheel 100 at its upper end. Secured on the lower end of the screw 99 is a plate 101 that is in a plane normal to the axis of said screw, and that projects to opposite sides of the latter.

Spaced above wheels 70 and extending over both wheels is the apricot hold-down plate 102 generally horizontally extending, but is linearly curved to generally follow the circular outer peripheral curve of the wheels 70 and blade 77 for the major portion of its length extending rearwardly from its forward end. The forward end portion 103 may be relatively straight. In cross sectional contour the side 104 of the hold-down facing the wheels is of generally inverted V-shape that is substantially complementary to the V-seat formed by the outer peripheries of wheels 70.

Projecting from the upper or back side of the hold-down 102 are two pairs of spaced opposed ears 105 and 106, the pair of ears 105 being at the rearward end of the hold-down, and the pair 106 being substantially at the juncture between the straight forward end portion 103 and the linearly curved portion. The portion of the hold-down between the pairs of ears is centrally slotted to pass the lower end of blade 90 (FIG. 16).

An arm 109 has one of its ends disposed between the rearward pair of ears 105, and is pivotally connected thereto by a horizontal pivot 110. Arm 109 extends slantingly upwardly and rearwardly from pivot 110, and its upper end carries a forwardly and upwardly extending plate 111 that is formed with a row of openings 112. One end of a helical spring 113 is secured in one of said openings, and the opposite end of said spring is secured to bolt 98 that is at the rearward ends of arms 80.

An elongated link 114 is pivotally connected at one of its ends by a horizontal pivot 115 with arm 109 at a point intermediate the ends of arm 109, and extends upwardly from pivot 115, and a second link 116 is pivotally connected in a position between ears 106 by a horizontal pivot 117, while the opposite end thereof is connected by a horizontal pivot 118 with the upper end portion of link 114. Link 116 extends generally forwardly from pivot 118. Pivot 118 is, in turn, supported under arms 80 by brackets 119.

The pivot 118 is spaced from the outer ends of the links 114, 116 and the outermost end portions 121, 122 of links 114, 116 that project past said pivot 118 extend past opposite edges of plate 101 on the adjusting screw 99 to engage said edges in a scissor-like manner. A projection 123 on link 116 adjacent to ears 106 functioned as a stop against which blade 90 was yieldably held by spring 93.

By the foregoing arrangement, when no apricot was between it and the wheels, the straight forward end 103 of the hold-down extended divergently upwardly in a forward direction relative to the belts 118 that delivered the apricots onto the seats 76 on the wheel rims. The plate 101 between the end portions 121, 122 of the links 114, 116 plus the action of springs 113 and to some degree the action of spring 93 would yieldably hold the hold-down as seen in FIG. 8.

Upon rotating the hand wheel 89 on screw 87, the entire hold-down assembly including blade 90 may be elevated or lowered.

Upon rotating the hand wheel 100, so that plate or cam 101 would move downwardly or upwardly, the position of the hold-down relative to the blade 90 may be changed.

In any relationship between the hold-down and the blade 90 or between the hold-down assembly as a whole and the wheels 70, the blade 90 may yieldably swing forwardly at its lower end.

The lower edge 124 of blade 90 generally follows the annular contour of the outer periphery of the circular blade 77, but preferably extends progressively closer to said blade 77 in a rearward direction, as does the curved portion of the hold-down, however, the degree of convergence is relatively slight. Said lower edge 124 comprises teeth, generally like square saw teeth, that extend slightly upwardly along the forward edge of the blade. The lower and forward edge of the blade 90 is not sharpened, hence the teeth have transversely extending sharpened edges. These edges are adapted to engage the pit of a bisected apricot.

As seen in FIG. 14 upon an apricot 56 being carried between the hold-down and the wheels 70 the apricot will be rotated about its axis in an opposite direction to the direction of rotation of the wheels about their axis, and at the same time the body of the apricot will be progressively bisected from below by blade 77. Thus the previously cut side of the apricot will be advanced to the blade 90 so that the lower end of the latter will enter the cut made by the blade 77, and there will be no injury to the flesh, although the V-shaped seats on the hold-down and the wheels will tend to hold the halves of the apricot together. However, engagement between teeth 124 forming the lower edge of blade 90 and the convergence of said row relative to the wheels 70 will cause the pit to be engaged between the blade 77 and blade 90. Normally, where the pits do not cling to the apricot halves, the separation between the halves and the pit is readily effected where the rate of rotation of the blade 77 and wheels 70 is the same. However, by the drive arrangement shown in FIGS. 1 and 13, the blade 77 may be rotated at a faster rate of speed than the wheels.

Blade 77 when formed with several outwardly opening notches 125 in its outer periphery, with the advancing edge 126 extending generally radially, the pit may enter such notch by being forced into the same by blade 90 when the blade 77 is rotated at a sufficiently greater speed than wheels 70 to cause a notch to reach the apricot before the latter leaves the blade 90. In such cases the pit will be knocked free from the body.

FIGS. 14, 15 show not only the rocking movement of the hold-down but the swinging of the blade 90. By this swinging of blade 90 it will follow the pit with its pit engaging teeth.

The adjustment enabled by the two adjusting screws 87 and 99 is quite important due to the variations that occur in certain lots of apricots.

It is seen that when the apricot 56 is first carried into engagement with hold-down 102 the forward end of the hold-down will be moved upwardly under the tension of spring 113, and the end portion 122 of link 116 will move away from the head 101 while the end portion 121 of link 114 will be held against said head, and as soon as the pit engages the teeth of blade 90 the latter may swing upwardly and rearwardly at its lower end to pass the pit and to place yieldable tension of spring 93 on said pit.

As the apricot is carried toward and below the rearward end of the hold-down 102 the rearward end will swing upwardly and more tension will be placed on spring 93 (FIG. 15).

For relatively small variations in apricot sizes, rotating hand wheel 100 to adjust hold-down 102 while leaving blade 90 in its same relative position would be sufficient. However, for extra large apricots both hold-down 102 and blade 90 would be adjusted by the use of hand wheel 89 in which case the same relative position would be maintained between blade 90 and hold-down 102.

The employment of the elastic coil spring belts in place of others is important for the reason that they hold up under actual conditions of use, providing a resilient carrier, whereas those of other material, such as rubber or plastic, deteriorate rapidly, both as to strength and yieldability.

It has been pointed out that the motor 45 is adapted to drive the various pulleys including the feeder 2. A belt 129 (FIG. 1) may connect pulley 130 on the shaft of motor 45 or on the driven shaft of any suitable conventional transmission means, with a pulley 131 that is secured on a shaft 132. Shaft 132 is journalled for rotation in bearings carried by frame 18, and which shaft has a corresponding pair of pulleys 133 secured thereto, one of which is connected by a belt 134 with a pulley 135 that is adjacent to the feed end of the apparatus. Pulley 135 is secured on a shaft 136 and a similar diameter pulley 137 is secured on said shaft. The shaft 136 is rotatable in bearings carried by frame 18. A belt 138 connects pulley 137 with the pulley 139 that is on shaft 44 (FIGS. 1, 2). The shaft 44 carries the pulley 46 over which belt 47 extends, and it also carries the sprocket wheel 43 over which sprocket chain 40 extends, and which chain drives the feeder 2.

A sprocket wheel 140 that is on shaft 132 is connected by a chain 142 with a sprocket wheel 143 secured on hollow shaft 72 (FIG. 13) and a similar sprocket wheel on shaft 132 (not shown) is connected by a sprocket chain with a sprocket wheel 144 secured on hollow shaft 71. Since the sprocket wheels 140 on shaft 132 are the same size and wheels 143, 144 are the same size, the shafts 71, 72 that carry the wheels 70 will rotate at the same speed.

A pulley 146 (FIG. 1) on shaft 132 is connected by a belt 147 with a variable speed pulley 148 (FIG. 13), which pulley, in turn, is secured on shaft 73.

By adjusting pulley 148 the blade 77 may be rotated faster or slower than wheels 70, or at the same speed. Normally the blade is rotated at a faster rate of speed, and it is pertinent to note that the same adjustment may effect different relative rates of speed between the spring belts 69 and the belt 47, since the belt 69 may slip relative to the pulleys 68.

It should be noted that the apparatus described so far is applicable to both FIGS. 1 and 6, and all of the details described with respect to FIGS. 8, 10, 13–16 are identical with the structure of either FIGS. 1 or 6.

FIGS. 7–9, 11, 12 are shown in association with the specific orienting portion of FIG. 6, which is designated generally 150 and which corresponds to the portion 47 (FIG. 1).

This modification of the apparatus that is shown in FIGS. 1, 4 and 5 substitutes a pair of endless, horizontally extending, and generally vertically disposed belts 151, 152 for the plates 54 of FIGS. 1, 4 and 5.

The feed and discharge ends of these belts may be substantially the same, hence the relationship between the belts 151, 152 at the discharge end as seen in FIG. 1 may be the same as at the receiving end adjacent to the feeder, and the same numbers will be used.

Said belts 151, 152 extends around vertically disposed corresponding pulleys 153 at the receiving end (FIG. 6) and pulleys 154 at the discharge end. In the illustration the belts 151, 152 are adapted to be driven at the same speed so their adjacent runs will move from the feeder 2 to the pitter 5 at any one of different rates of speed relative to the belt 47, as will be later described.

The pair of pulleys 153 at the receiving ends of the belts 151, 152 are spaced apart so that the largest size apricots, or fruit, will pass between them and the belts, and from pulleys 153 the adjacent vertically disposed runs of the belts extend between a pair of generally vertically disposed rollers 156 that are supported for rotation on vertical shafts 157 carried by the frame 18. These rollers at 156 may be slightly closer together at their adjacent sides than the adjacent sides of the pulleys 153 so as to progressively bring the belts closer together. Intermediate sets of rollers 158 (FIGS. 6, 7) yieldably engage the oppositely outwardly facing surfaces of the adjacent runs of belts 151, 152 and yieldably hold said belts in generally the same inclined positions relative to each other as the strips 154 of FIG. 4. Shafts 159 support said rollers 158 for rotation, and the lower ends of shafts are secured to a pair of generally horizontally extending arms 160 (FIG. 7). The arms 160 are pivotally connected at their outer ends to the ends of rigid cross members 161 by horizontal pivots 162. Since the shafts 159 and rollers 158 are spaced from pivots 162 toward each other, and as belts 151, 152 are of relatively thin and flexible plastic material, the weight of the rollers 158 and shafts 159 plus the added weight of the arms 160 will cause the rollers to yieldably hold said belts in the inclined positions shown in FIG. 7 so they will yieldably contact the fruit at the same points as described with reference to the strips 54. The inner adjacent ends of the arms 160 are in lapping relation and a pin 163 on one extends through a slot 164 in the other so the swing of the rollers will be the same, and fruit will be centered between them on belt 47. If desired, the adjacent ends of the arms 160 may, of course, be weighted, should greater pressure against the apricots be desired, or should the character of the belts be such as to require more force than would otherwise be necessary.

Pivots 162 are carried on the ends of cross members 161, that in turn are carried by the support 53 that carries belt 47.

Adjacent to the pitter 5, a pair of vertically supported rollers 166 (FIG. 9) yieldably hold the adjacent ends of belts 151, 152 substantially parallel and slightly closer to each other than they are held by pulleys 154 (FIG. 12).

These pulleys 166 are adjustable relative to each other and are supported for rotation on shafts 167 that in turn depend from the corresponding ends of a pair of horizontally disposed crank arms 168, the other arms 169 of which extends toward each other to lapping relation and a pin 170 on one arm extends into a slot 171 (FIG. 12) in the other arm so the crank arms 168 will move together upon one being moved.

Vertical shafts 175 pivotally support the cranks having arms 168, 169 thereon, which shafts depend from and are secured at their upper ends to a horizontal plate 176 (FIG. 9) that is rigid with the frame 18. Plate 176, in turn, has an upstanding pair of horizontally spaced opposed lugs 177, 178 rigid thereon, which lugs have coaxial apertures through which a horizontal rod 179 slidably extends. One end of rod 179 projects outwardly of the pair of lugs at the end that is adjacent to lug 177 and carries a helical spring 180 that is interposed between said lug 177 and a nut and washer 181 secured on the outermost end of said rod.

The end portion of rod 179 that is opposite to the end carrying spring 180 projects from lug 178, and an arm 183 is adjustably secured thereto by a set screw 184. Thus arm 183 projects downwardly from rod 179 and an adjusting screw 185 threadedly extends through its lower end and into engagement with the outer side of one of the crank arms 168 (FIGS. 9, 12). The arm 183 also projects above shaft 179 and it carries a stub rod 186 (FIG. 9) that slidably extends through an opening formed in projection 178 to hold the screw 185 so the latter will properly engage crank arm 168 when the arm 183 is adjusted along rod 179.

By this structure the adjacent runs of belts 151, 152 that are next to the rollers 154 are yieldably held in spaced opposed relation by spring 180, and the spacing between said adjacent runs may be varied by adjusting screw 185, and the degree of tension applied to the belts may be varied by the combination of screw 185 and the adjustment of the position of arm 183 on rod 179.

Pulleys 154 (FIG. 11) are rotatably carried on the lower ends of shafts 187, which shafts, in turn, are secured at their upper ends to the outer ends of a pair of corresponding arms 188. The opposite ends of said arms 188 have upstanding hubs 190 or cylindrical upward extensions rotatably supported on a pair of upstanding stationary shafts 191 each having a collar 192 rigid thereon above each hub 190. Torsion springs 193 respectively around hubs 190 engage collars 192 at one end and arms 188 at their opposite ends, and react between said collars and arms to yieldably hold the belts 151, 152 taut at all times.

Vertical pulley shafts 195 are secured to pulleys 153 (FIGS. 6, 17) and extend downwardly therefrom and are journalled for rotation in bearings rigid with frame 18. A bevel gear 198 on the lower end of each shaft 195 meshes with a corresponding bevel gear 199 on shaft 200 that, in turn, is rotatably supported on frame 18. Shaft 200 has a pulley 201 secured on the outer end thereof which is operatively connected to the drive mechanism (not shown). Bevel gears 199 are in opposed relation to each other in order to rotate gears 198 and shafts 195 in opposite directions.

Normally the belt 47 moves faster than the belts 151, 152 with the result that the apricots are rotated about their horizontal axes that extend at right angles to their path of travel from the orienting device to the pitter, which is counter-clockwise in FIG. 6.

It is to be understood that conditions may vary in which the belts 151, 152 may not be driven, and in such an instance, the action would be much the same as where strips 154 are used, except that adjacent apricots or fruit of different sizes would maintain better contact with the side belts on their way along the orienting station due to the yieldability of the material of the belts themselves.

In operation, the apricots or similar fruit having major and minor axes, move in adjoining relation and in a path extending longitudinally of the file, and in one direction along said path, and while in this adjoining relation they are in indiscriminate relation to each other insofar as their stem-blossom axes are concerned. The apricots, or similar fruit, are then uniformly spaced apart in succession, from the leading end of the file and continue movement along said straight path in substantially equally spaced relation, but still in single file, and during this movement they are rolled about horizontal axes extending at right angles to said path and are arranged to roll on their major diameters or with their major axes in a vertical plane, thus orienting them. Such fruit, it is to be understood, has the characteristic that their stem-blossom axes are also in the dimension of their major axes, and the sutures of the fruit are also in the dimension of their major axes. Thus the fruit is oriented with respect to stems or stem-blossom axes and sutures. During passage along the orienting path, the fruit is held down on the carrying or supporting belt at two points on opposite sides of each fruit body, and which points are equally spaced above the level of the center of each body.

At the end of the orienting path the oriented fruit bodies continue their movement along the straight path and their counter-clockwise rotation, as seen in FIG. 14, continues, and blade 77 starts bisecting the fruit body to the pit from the lower side of the body, so as to open the fruit to entry of blade 90. At this point the hold-down 102 will yieldably hold the fruit body against the wheels 70 and before the body is fully bisected the pit will be engaged by the teeth of blade 102, which blade, as already stated, is driven at a substantially faster rate of speed than the wheels. The result is that the pit and the apricot body will be rotated at different rates of speed, and the pit will separate from the halves. As soon as this occurs the pit and halves drop into a chute 206 (FIG. 1) and are carried away. The same chute is used in FIG. 6 for the same purpose.

With the above arrangement not only is the operation of pitting faster, but the pitting is more efficient, since pits that otherwise would cling to one or the other of the halves, would be separated.

We claim:

1. The method of pitting an apricot that includes the steps of:
    (a) rotating said apricot about an axis that is substantially at a right angle to the plane of its suture;
    (b) progressively bisecting the body of said apricot to its pit in said plane commencing at one side of said apricot during said rotation to provide a pair of halves having opposed cut faces;
    (c) then gripping the pit at two opposite edges thereof and between said opposed cut faces, and
    (d) positively rotating said halves and said pit relative to each other at different rates of speed to separate said pit from said halves.

2. The method as defined in claim 1, that includes the step of:
    (e) moving said apricot and said pit along a path of travel in one direction during said steps of bisecting the body and the rotation of said pit and halves relative to each other.

3. The method of pitting an apricot that includes the steps of:
    (a) moving said apricot along a horizontally extending path of travel in one direction;
    (b) positioning said apricot in said path with its suture in a vertical plane that is parallel with said path;
    (c) rotating said apricot about a horizontal axis that is at a right angle to said plane and while said apricot is being moved in said one direction so that the leading surface of said apricot moves upwardly and then in a direction opposite to said one direction;
    (d) cutting the body of said apricot in said plane from a point below said apricot during its movement in said one direction and during said rotation of said apricot whereby the leading and upper side of said apricot will be opened by the aforesaid cutting step in advance of the trailing side;
    (e) engaging said pit through the cut in leading and upper side thereof and then;
    (f) positively rotating said pit relative to said body at a rate of speed faster than the rotation of the body of said pit to thereby fully separate said pit from said body.

4. The method of bisecting apricots and pitting them that comprises the steps of:
    (a) moving said apricots in single file in one direction along a substantially straight horizontally extending path of travel successively past a file forming station, an apricot spacing station, and an orienting station for orienting said apricots to position them with their sutures in a vertical plane parallel with said path, and a body bisecting and pitting station;
    (b) rolling said apricots about axes extending substantially parallel with said path and substantially in engagement with each other during said movement thereof through said file forming station;
    (c) retarding the movement of successive apricots in said file during their movement through said apricot spacing station, in order, commencing with the leading apricot and then successively releasing said apricots from said station and moving the apricots so released at an accelerated speed whereby said apricots will leave said spacing station in equally spaced relation;
    (d) and while moving said apricots through said orienting station at said accelerated speed and in said spaced relation rotating said apricots about axes extending at right angles to said path so their leading surfaces rotate upwardly and then rearwardly, and at the same time arranging said apricots with their sutures in a vertical plane parallel with said path; then
    (e) progressively bisecting each apricot to its pit at said bisecting and pitting station and gripping each pit and moving it relative to the halves after each apricot is bisected to thereby free the pit from the body.

5. The method of pitting apricots and the like that comprises the steps of:
    (a) continuously receiving a plurality of apricots in a single file from an indiscriminately arranged plurality thereof with said apricots so received in engaging relation with each other but with their sutures in indiscriminate relation to each other;
    (b) rolling said apricots in a substantially straight path extending longitudinally of said file while in said engaging relation with each other;
    (c) successively spacing said apricots from each other commencing at the leading end of said file at a point in said path and continuing the movement of said apricots thereafter in said path in spaced relation to each other and at the same time supporting said apricots with their sutures in a vertical plane for rotation in said path on their sutures and yieldably holding said apricots against a supporting surface from opposed points on each apricot spaced above its center of gravity during said rotation;
    (d) then progressively bisecting the body of each apricot from below and then;
    (e) rotating the pit of each apricot and the halves of said body at different rates of speed to separate each pit from said halves.

6. The method as defined in claim 5 in which said steps are performed during said movement of said apricots substantially in said straight path.

7. In apricot orienting, bisecting and pitting apparatus that includes a horizontally extending endless conveyor belt having an upper surface adapted to support apricots thereon in a single file extending longitudinally of said belt; means connected with said belt for moving it in one direction longitudinally thereof at a predetermined rate of speed toward a discharge end thereof; an apricot bisecting and pitting means adjacent to said discharge end adapted to receive apricots discharged from said discharge end with their sutures in a vertical plane coincidental with said belt and to remove the pits from such last mentioned apricots, the improvement that comprises:
(a) a pair of corresponding, horizontally elongated, parallel strips in side by side relation equally spaced at opposite sides of said belt;
(b) means yieldably supporting said strips in positions projecting above the level of said belt with one of their flat sides in generally opposed relation but extending convergently upwardly in relation to each other and spaced apart a distance to yieldably engage apricots on said belt at points at opposite sides of said apricots that are spaced above the centers of gravity of said apricots whereby said apricots will be yieldably urged against said belt from said points and will be oriented during the movement of said belt for delivery to said bisecting and pitting means with their sutures in said vertical plane.

8. In a construction as defined in claim 7:
(c) said means supporting said strips also holding said strips against movement with said conveyor at the speed of the latter to thereby slidably and frictionally resist said movement of said apricots at said points while holding said apricots against said belt whereby said apricots will be rotated about axes extending at right angles to said plane for upward movement of their leading sides during movement thereof to said bisecting and pitting means, and;
(d) said bisecting and pitting means including conveyor means substantially in continuation of said belt and movable in said one direction, and a hold down device above said conveyor means for slidably and frictionally engaging said apricots at points at opposite sides thereof spaced above their centers of gravity to thereby continue said rotation of said apricots about said axes thereof upon movement of said conveyor means in said one direction.

9. In a construction as defined in claim 7:
(c) said means supporting said strips including members at opposite ends of said strips supported for bodily movement toward and away from each other different distances for changing the spacing between said strips;
(d) supporting means supporting said members for said movement, and
(e) means connected with said supporting means for so moving the latter.

10. In apricot orienting, bisecting and pitting apparatus that includes a horizontally extending conveyor belt having an upper surface adapted to support apricots thereon in a single file extending longitudinally of said belt; means connected with said belt for moving it in one direction longitudinally thereof at a predetermined rate of speed toward a discharge end thereof; an apricot bisecting and pitting means at said discharge end adapted to receive apricots discharged from said discharge end with their sutures in a vertical plane coincidental with said belt and to remove the pits from such last mentioned apricots, the improvement that comprises:
(a) a pair of corresponding horizontally extending flexible endless belts in horizontally spaced side by side relation providing a pair of adjacent runs thereof in generally opposed horizontally spaced relation extending longitudinally of said conveyor belt adjacent to opposite edges of the latter and projecting upwardly above the level of said conveyor belt;
(b) vertical end pulleys at opposite ends of said belt rotatable about vertical axes supporting said pair of belts for movement of their said adjacent opposed runs longitudinally thereof in the same direction to said apricot bisecting and pitting means;
(c) pairs of idler pulleys respectively adjacent to opposite ends of pair of belts positioned between the runs of each belt of said pair in engagement with the oppositely outwardly facing sides of said pair of adjacent runs;
(d) supporting means supporting the pulleys of each idler pair thereof at each of said ends of said pair of belts for movement about axes extending parallel with said conveyor belt to inclined positions extending convergently upwardly for holding the portions of said adjacent runs that are between the idler pulleys at the ends of each run in inclined positions substantially corresponding to the inclinations of said idler pulleys;
(e) said supporting means supporting each pair of idler pulleys at each of said ends of said endless belts in positions for holding said adjacent runs in frictional engagement with apricots adapted to be supported on said conveyor belt at points spaced above the centers of said apricots whereby said adjacent runs will urge said apricots against said conveyor belt;
(f) and means for yieldably urging said idler pulleys for said movement about said axes of said supporting means to said inclined positions thereof from vertical positions of said idler pulleys for yieldably holding said runs against apricots at said points on the latter.

11. In a construction as defined in claim 10:
(g) pulley supporting means supporting said vertical end pulleys at the ends of said endless belts that are adjacent to said bisecting and pitting means for movement toward and away from each other, and
(h) means connected with said last mentioned pulley supporting means for so moving said last mentioned vertical pulleys toward and away from each other to different adjusted positions and for holding them in said adjusted positions.

12. In a construction as defined in claim 10:
(g) means connecting the pulleys of each pair of idlers for simultaneous movement toward and away from each other under the influence of pressure against one of the pulleys of each pair whereby said adjacent runs will center apricots of different sizes on said conveyor belt in the event apricots between said adjacent runs should be offset to one side or the other relative to said conveyor belt.

13. In apricot orienting, bisecting and pitting apparatus that includes conveyor means adapted to support apricots thereon for movement thereof along a generally horizontally extending path of travel in one direction to a delivery point with the apricots having their sutures in a vertical plane coincidental with said path, and apricot bisecting and pitting means at said point having an apricot support substantially in continuation of said belt and movable in the same direction as said conveyor means for continuing movement of said apricots along said path, the improvement that comprises:
(a) an elongated hold-down;
(b) hold-down supporting means rockingly supporting said hold-down spaced above said apricot support in a position extending longitudinally of said path but slightly convergently relative to said support in the direction of movement of the latter for engagement with the surface of an apricot that is opposite to said apricot support upon such apricot being carried by said support to a position between the latter and said hold-down;
(c) said hold-down supporting means also supporting said hold-down for bodily movement toward and away from said apricot support during rocking movement of said support;
(d) yieldable means reacting between said hold-down for yieldably resisting said rocking movement;
(e) single, manually actuatable adjusting means operatively connected with said hold-down for varying degree of yieldable resistance of said yieldable means to rocking of said hold-down upon actuation of said manually actuatable means.

14. In a construction as defined in claim 13:
(f) a manually actuatable member connected with said hold-down supporting means manually actuatable for moving said hold-down and said single manually actuatable means to different distances from said apricot support and for holding said hold-down at any one of said distances while permitting said rocking and bodily movement of said hold-down against said yieldable resistance of said yieldable means.

15. In a construction as defined in claim 14:
(g) said apricot bisecting and pitting means including upper and lower pit engaging members extending longitudinally of said hold-down and disposed between said hold-down and said apricot support and between which the pit of an apricot that is between said hold-down and said support is adapted to move upon said apricot being moved along said path in said one direction;
(h) one member of said pair thereof being a cutter disposed in said plane having a cutting edge extending into said path from one side thereof to the pit of an apricot on said support, and
(i) the other member of said pair being a row of teeth in said plane extending longitudinally of said hold-down and a blade in said plane having said teeth rigid thereon, said teeth projecting into said path from the side thereof opposite to said one member.

16. A construction as defined in claim 15:
(j) said cutter being the lower member of said pair;
(k) said blade and teeth thereon being the upper member of said pair, and
(l) means pivotally supporting said blade on said hold-down supporting means for swinging about an axis at a right angle to said plane, and
(m) means yieldably resisting movement of the teeth and portion of the blade carrying the latter in the direction of movement of an apricot in said path.

17. Apricot processing apparatus comprising, in combination:
(a) apricot receiving means for receiving and supporting apricots in indiscriminate relation with respect to their sutures in a single, horizontally extending file in engaging relation and for simultaneously rolling said apricots in one direction longitudinally of said file and rotating them about an axis extending generally longitudinally of said file for discharge from one end of said apricot receiving means;
(b) said apricot receiving means including apricot separating means for engaging and discharging said apricots from said one end in equally spaced relation;
(c) horizontally elongated apricot orienting means generally in longitudinal alignment with said apricot receiving means having a receiving end adjacent to said one end of said apricot receiving means for receiving apricots in said spaced relation from said discharge end of said apricot receiving means, said apricot orienting means including:
(d) a horizontally extending conveyor belt on which said apricots are received and a pair of apricot engaging elements parallel with said belt spaced above and at opposite sides of said belt in a position for frictionally engaging each apricot on said belt at opposite points above the centers of said apricots, and means connected with said conveyor belt for moving it longitudinally thereof in direction away from said apricot receiving means for carrying said apricots away from said apricot receiving means to a discharge point at the end of the conveyor belt opposite to said apricot receiving means;
(e) an apricot bisecting and pitting means generally in horizontal extension of said apricot orienting means including an apricot support in a position to receive oriented apricots from said discharge point of said conveyor belt and movable in a direction away from said point for carrying apricots thereon along a horizontally extending path away from said point;
(f) said apricot bisecting and pitting means including a pair of vertically spaced horizontally elongated members extending generally longitudinally of said path between which the pit in an apricot carried by said apricot support is adapted to be moved upon said movement of said apricot, and means for yieldably urging one of said members toward the other yieldably gripping said pit between said members, one member of said pair being a cutting blade having a cutting edge adapted to cut the body of said apricot to the pit thereof, and the other member being a gripping blade having teeth thereon adapted to engage said pit at the side thereof opposite to said cutting blade and means connected with one member of said pair for moving it longitudinally of said path relative to the other member for rotating the pit gripped between said member relative to the body of said apricot.

References Cited by the Examiner
UNITED STATES PATENTS

| | | | |
|---|---|---|---|
| 2,417,174 | 3/47 | Prenveille | 146—28 |
| 2,474,492 | 6/49 | Perrelli et al. | 146—28 X |
| 2,745,453 | 5/56 | Perrelli et al. | 146—28 |
| 2,918,098 | 12/59 | Keesling | 146—28 |

J. SPENCER OVERHOLSER, *Primary Examiner.*